Feb. 28, 1928.

A. FLETTNER 1,661,114

METHOD AND DEVICE FOR THE STEERING OF SHIPS

Filed June 29, 1920     13 Sheets-Sheet 1

Inventor:

Anton Flettner

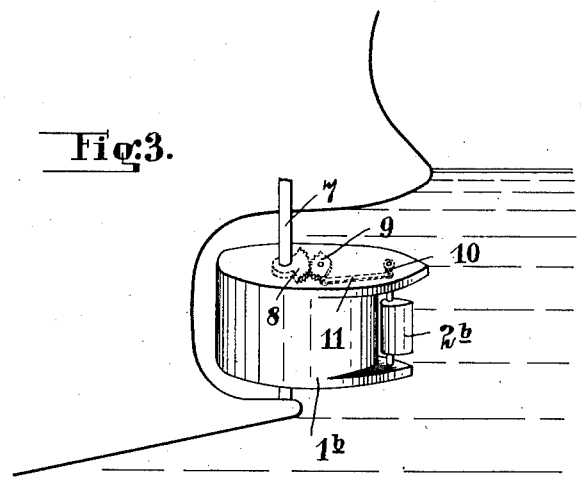
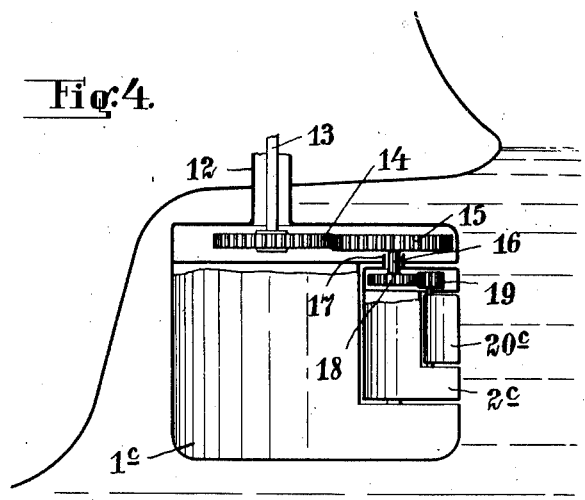

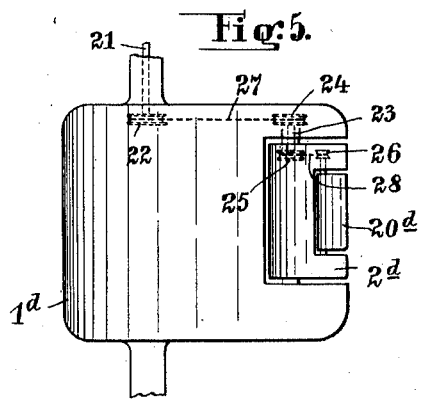
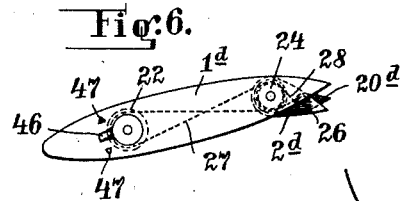
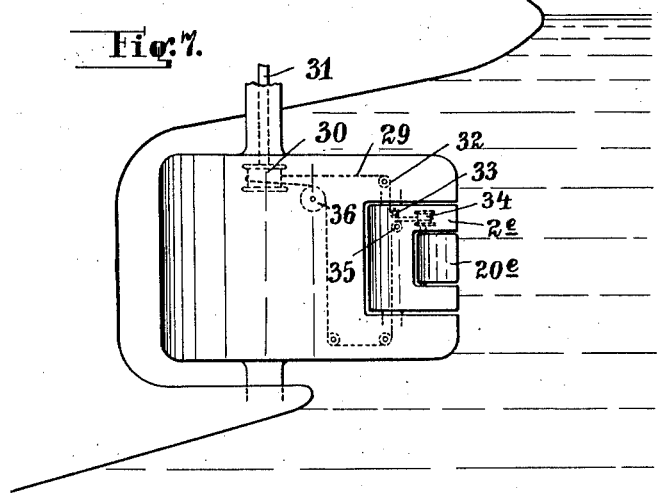

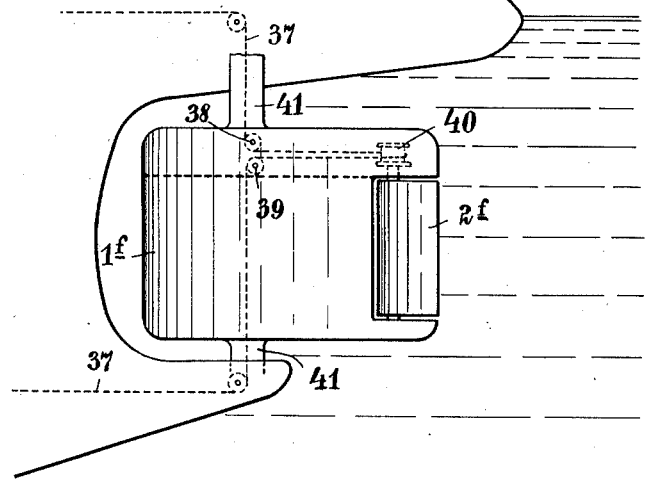
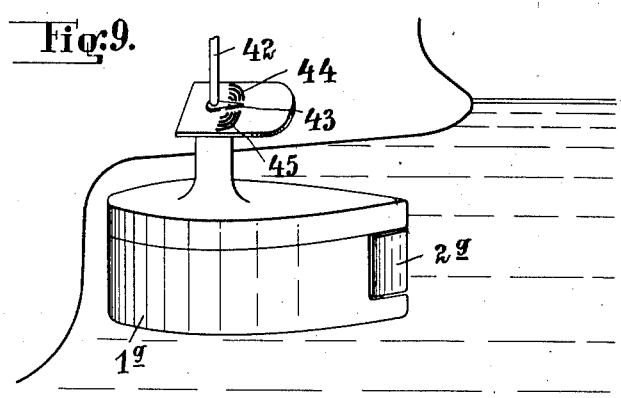

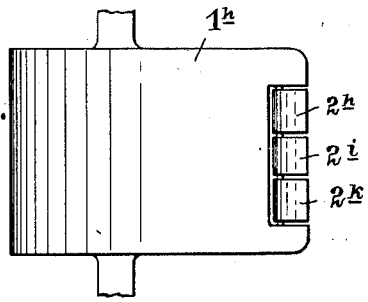
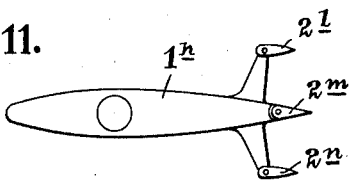
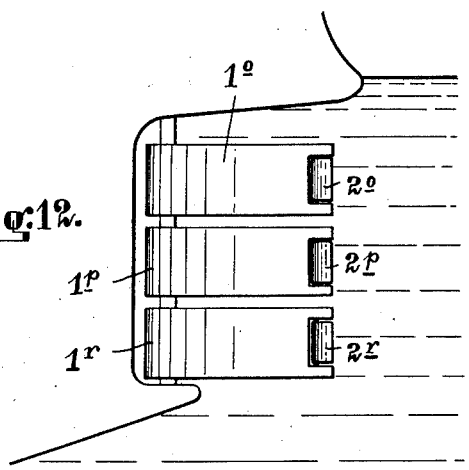

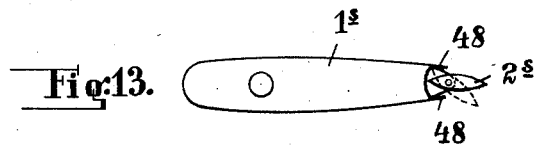
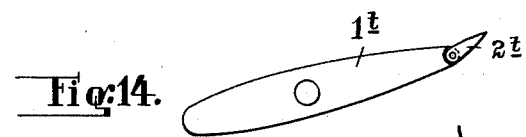
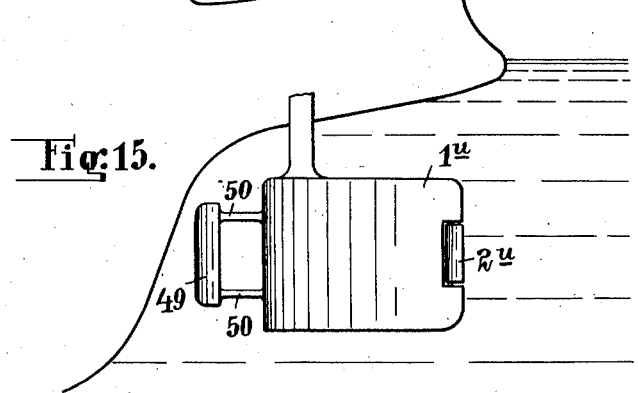
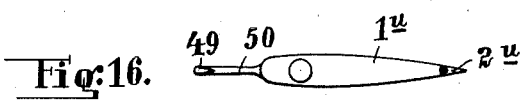
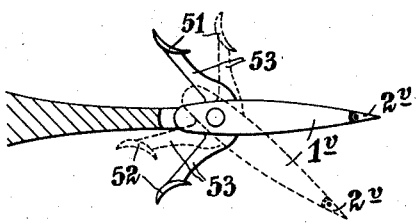

Feb. 28, 1928.
A. FLETTNER
1,661,114
METHOD AND DEVICE FOR THE STEERING OF SHIPS
Filed June 29, 1920    13 Sheets-Sheet 7
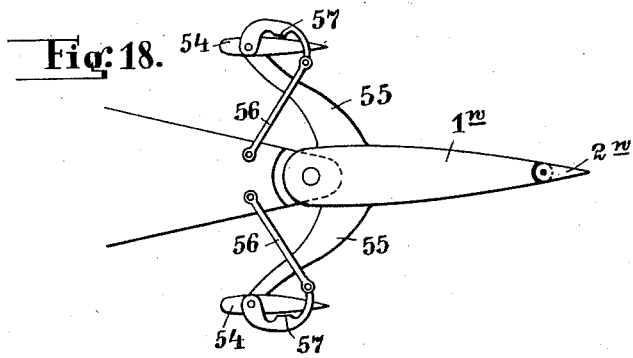
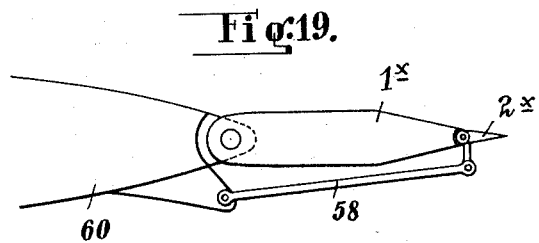
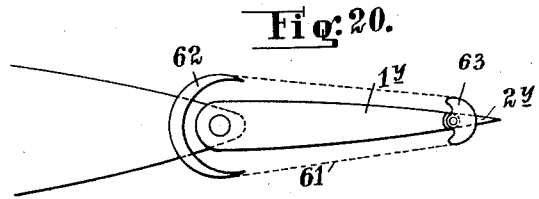
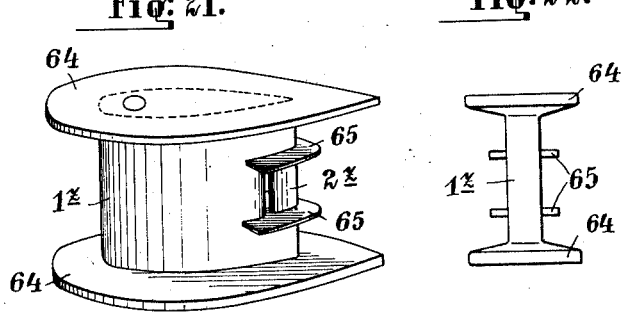
Inventor:
Anton Flettner

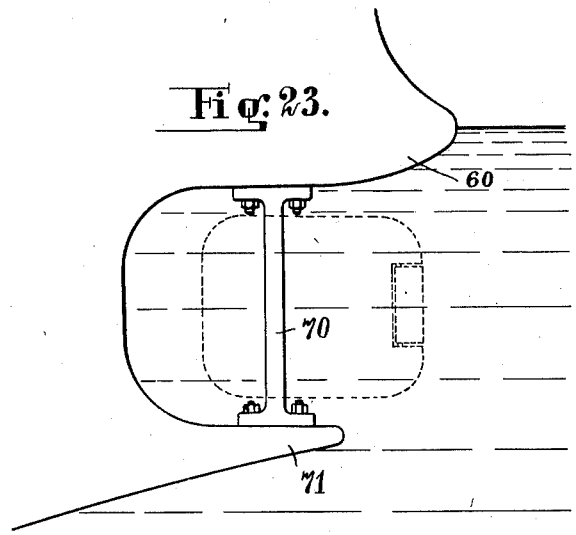
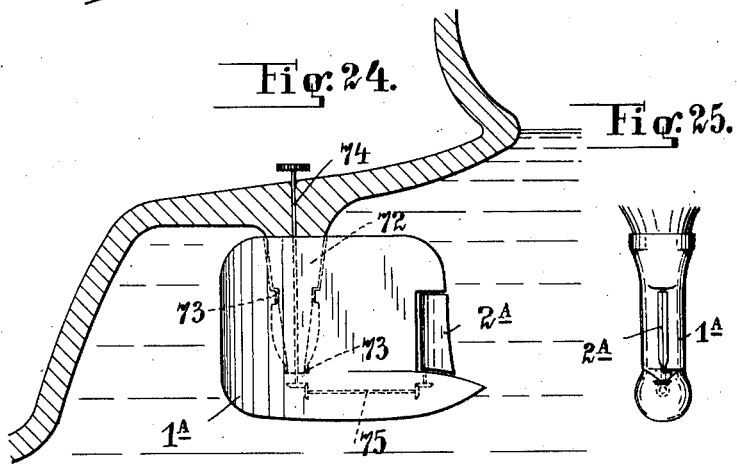

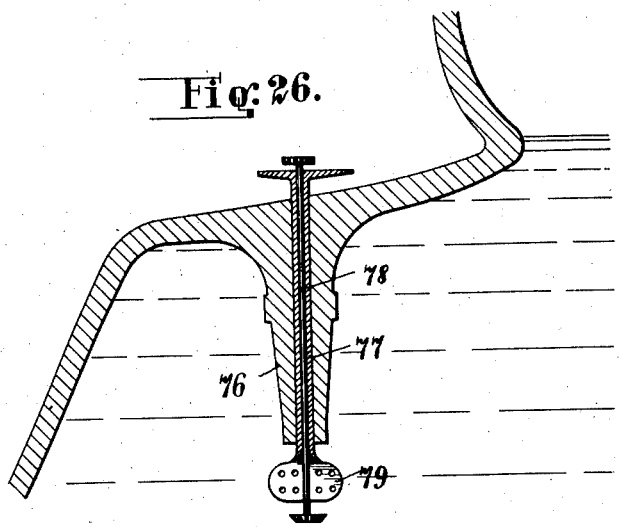
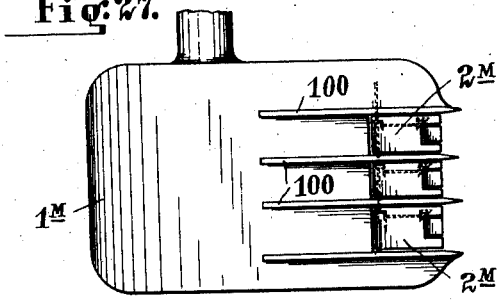

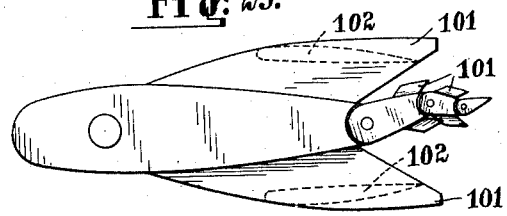
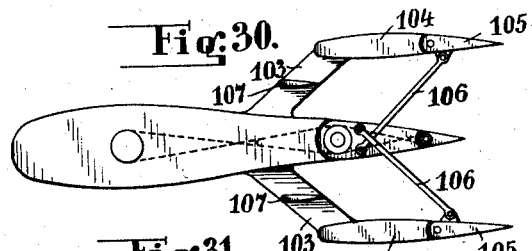
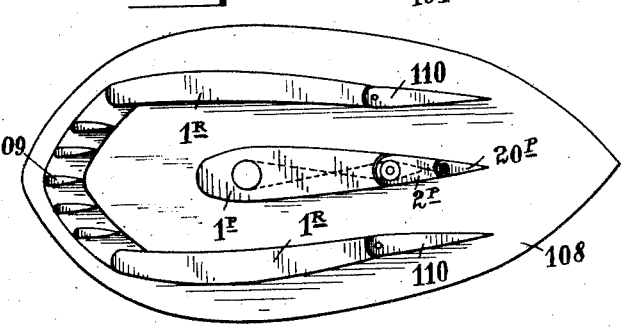
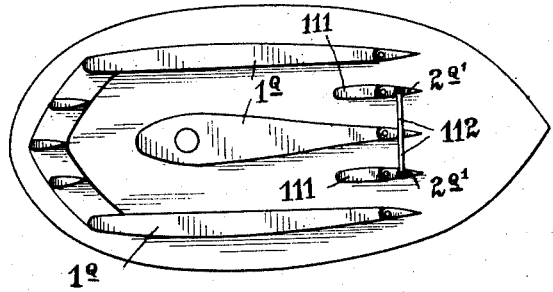

Feb. 28, 1928.　　　　　　　　　　　　　　1,661,114
A. FLETTNER
METHOD AND DEVICE FOR THE STEERING OF SHIPS
Filed June 29, 1920　　　13 Sheets-Sheet 11
Fig. 33.
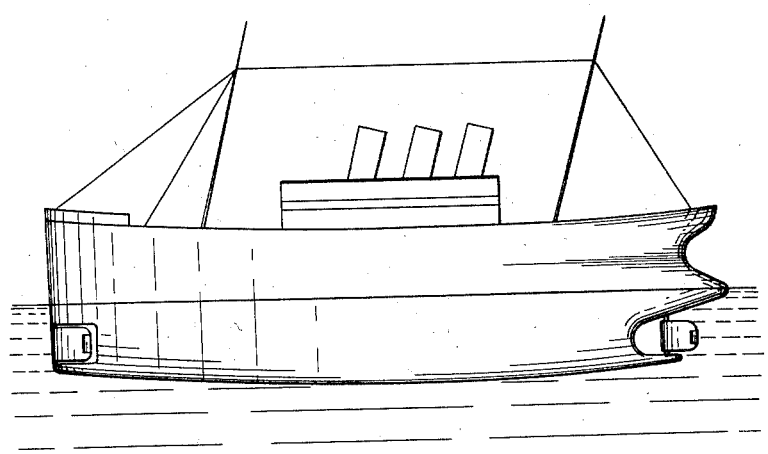
Fig. 34.　　　Fig. 35.
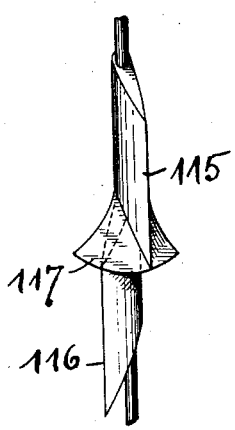 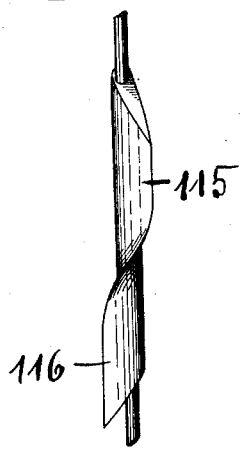
Inventor:
Anton Flettner Feb. 28, 1928.
A. FLETTNER
1,661,114
METHOD AND DEVICE FOR THE STEERING OF SHIPS
Filed June 29, 1920     13 Sheets-Sheet 12
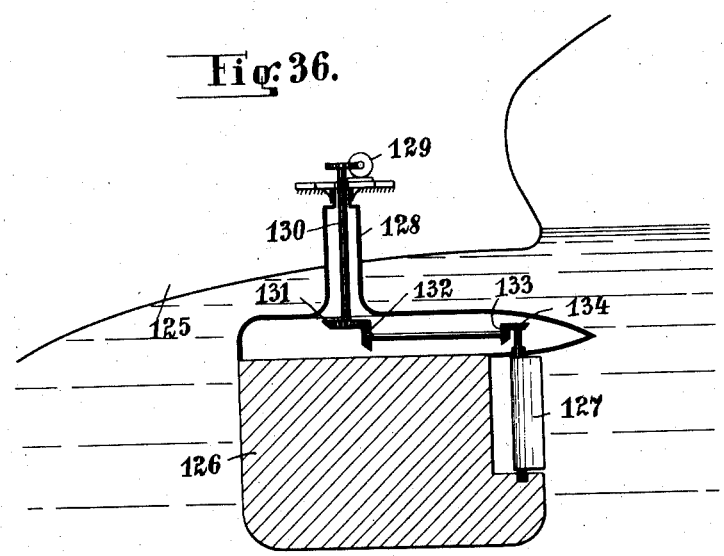
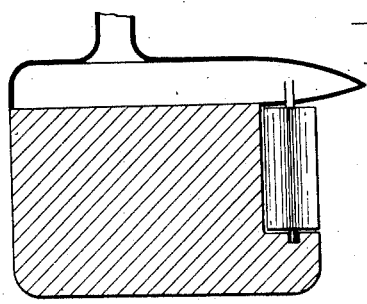
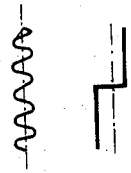
Inventor:
Anton Flettner Feb. 28, 1928. 1,661,114
A. FLETTNER
METHOD AND DEVICE FOR THE STEERING OF SHIPS
Filed June 29, 1920    13 Sheets-Sheet 13
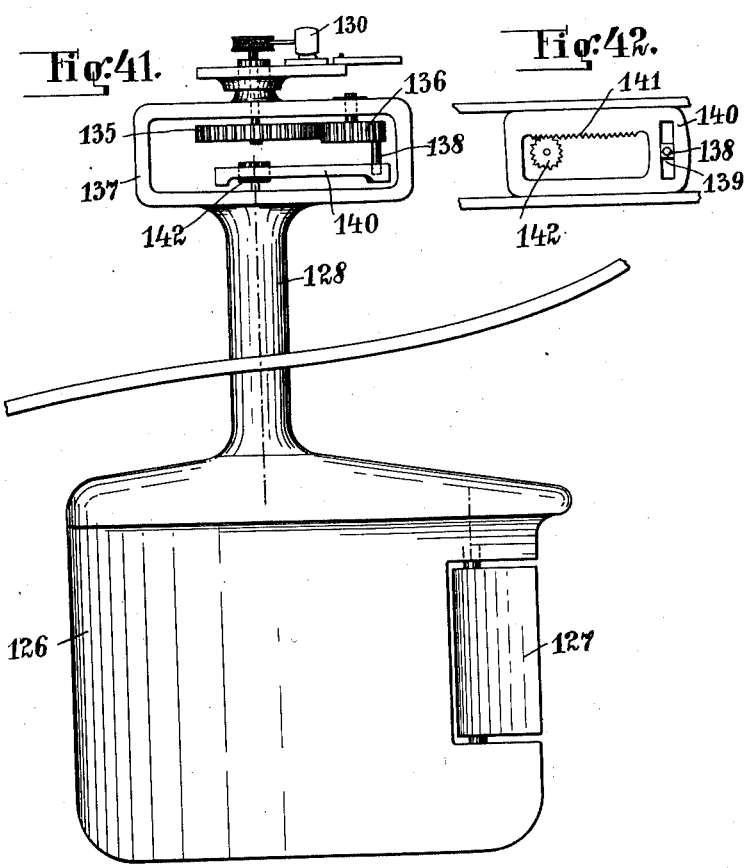
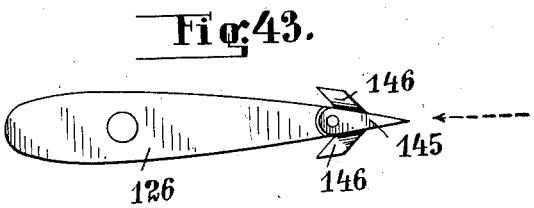
Inventor:
Anton Flettner Patented Feb. 28, 1928.

1,661,114

UNITED STATES PATENT OFFICE.

ANTON FLETTNER, OF GRUNEWALD, NEAR BERLIN, GERMANY.

METHOD AND DEVICE FOR THE STEERING OF SHIPS.

Application filed June 29, 1920, Serial No. 392,839, and in Germany June 16, 1917.

My invention relates to a method and devices for the steering of ships by the aid of which the service at the wheel is considerably simplified, the amount of force required in steering reduced to a fraction of that hitherto necessitated, and the steering efficiency itself essentially increased.

In accordance with my invention the rudder is in general not operated directly, but is deflected by aid of one or a plurality of auxiliary rudders, the actuation of which requires but a very slight expenditure of force. In other words, the rudder is treated as though it were itself a ship, and the steering effected by means of a small auxiliary rudder, mounted on the main rudder near the rear edge thereof. According to the position this auxiliary rudder is caused to assume, it will, acting under the force of the water current, shift the main rudder more or less either to larboard or to starboard, and thus effect the steering of the vessel. The size of the auxiliary rudder may stand in the same relation to that of the main rudder, as this latter to the size of the vessel.

However, it is possible to go yet further, and to cause also the auxiliary rudder to be steered by a second auxiliary rudder, the displacement of which requires still less expenditure of force, and so on.

Several forms of construction of the subject matter of my invention are shown diagrammatically by way of example in the accompanying drawings.

Figure 1:
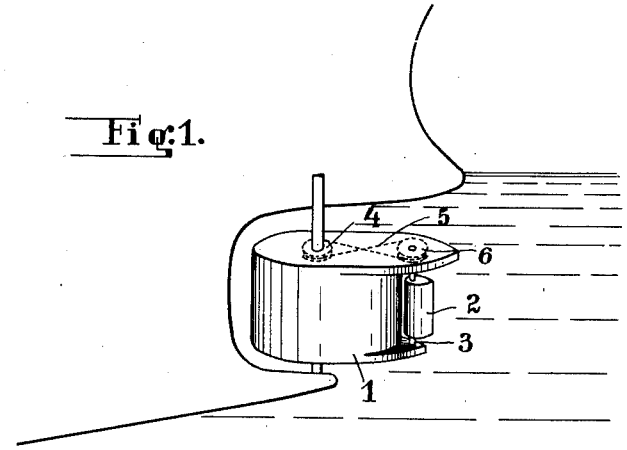
Figure 2:
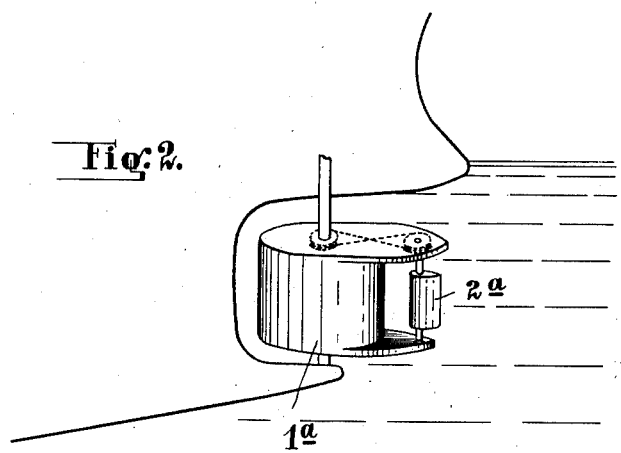

Fig. 1 is a perspective view of one form of the invention; Fig. 2 shows a modified form; Fig. 3 shows another modification for automatically maintaining the main rudder in the desired position; Fig. 4 shows an arrangement for the same purpose as Fig. 3, a second auxiliary rudder also being used; Figs. 5 and 6 are side and top views respectively of a modification showing two auxiliary rudders; Fig. 7 shows two auxiliary rudders and operating means therefor; Fig. 8 shows one auxiliary rudder and a modified operating means therefor; Fig. 9 shows an arrangement for automatically maintaining the main rudder in the desired position; Fig. 10 shows an arrangement of a plurality of auxiliary rudders arranged in different horizontal planes; Fig. 11 shows a plurality of auxiliary rudders arranged in different vertical planes; Fig. 12 shows the main rudder made in several sections, each section being operated by an auxiliary rudder; Fig. 13 shows a counter-balanced main rudder and a guard for the auxiliary rudder; Fig. 14 shows the main rudder more strongly counter-balanced than in Fig. 13; Figs. 15 and 16 are side and plan views respectively of a counter-balance for the main rudder; Fig. 17 shows another counter-balancing device for the main rudder; Fig. 18 shows still another counter-balancing device for the main rudder; Figs. 19 and 20 show two modifications where the auxiliary rudder is connected to a fixed point so that it is caused to move when the main rudder is moved; Figs. 21 and 22 are views showing protective surfaces associated with the main and auxiliary rudders; Fig. 23 shows a mounting means for the main rudder; Figs. 24 and 25 show another mounting means for the main rudder; Fig. 26 shows a still further mounting means for the main rudder; Figs. 27 and 28 show a plurality of auxiliary rudders and protective surfaces associated therewith; Fig. 29 is a modification showing a plurality of auxiliary rudders and protective surfaces therefor; Fig. 30 shows outlying auxiliary rudders operated by another auxiliary rudder and protecting surfaces for the rudders; Figs. 31 and 32 show different modifications for protecting the main and auxiliary rudders; Fig. 33 shows bow and stern rudders; Figs. 34 and 35 show specific shapes used for the auxiliary rudders; Fig. 36 is a modification, particularly for allowing reversal of the main rudder when the vessel is sailing astern; Fig. 37 is a modification of Fig. 36, the auxiliary rudder being mounted on a centrally disposed axis; Figs. 38, 39 and 40 show shapes for the rear edge of the main rudder and for the front edge of the auxiliary rudder; Fig. 41 shows a modification for allowing proper operation of the auxiliary rudder when sailing astern; Fig. 42 is a view of a detail of Fig. 41; and Fig. 43 is a modification of the auxiliary rudder for initiating the reversal of the main rudder.

In the arrangements disclosed by Fig. 1, there is arranged at the rear edge of the freely movable main rudder 1, on a vertical spindle 3, an auxiliary rudder 2, which is operated by a sheave 4, mounted on the spindle of the main rudder by the aid of a rope or chain drive 5, and another sheave 6. On this auxiliary rudder being shifted over to starboard, the water current acting on its surface will force the main rudder to larboard, and vice versa. In other words, the freely movable main rudder will follow exactly every movement of the sheave 4 and will turn through the same angle as this latter. As stated, the auxiliary rudder 2 may again be steered by a still smaller auxiliary rudder. However, the rudder 2 may also be arranged at some distance from the rear edge of the main rudder, as shown in Fig. 2, in which $1^a$ denotes the main rudder, and $2^a$ the auxiliary rudder.

It may further prove expedient to arrange an auxiliary rudder both at the front and the rear edge. The said auxiliary rudder may be disposed in an opening cut into the surface of the main rudder; it may, however, also be pivoted thereto, and this either at the end or at the side, or else be connected to said main rudder by means of levers.

The reduction of the actual steering work required to be done is due to the fact that the arm of lever of the auxiliary rudder is longer than the arm of lever appertaining to the main rudder; i. e. longer than the distance of the centre of pressure from the rudder axis. When the auxiliary rudder is displaced, its surface is subjected to pressure, and it effects by means of its lever arm the motion of the main rudder. It thus follows, that the steering work to be effected may be immediately derived from the force or pressure acting on the auxiliary rudder surface.

Experience has furthermore shown that special devices are required in order to set the main rudder by help of an auxiliary rudder correctly in every angular position that may be required at any time. For this could only be obtained directly if it were possible to nicely counterbalance the pressure $x$ of the auxiliary rudder relatively to the counter pressure $y$ exerted by the main rudder; in other words, if it were possible to determine the proper proportions of the main rudder relatively to the auxiliary rudder with absolute exactitude. A second condition would be that the pressure acting on the surface of the main rudder, in the case of a uniform increase of the angle of declination (i. e. the angle formed by the rudder and the longitudinal axis of the vessel), were to augment in the same proportion as the pressure acting on the surface of the auxiliary rudder.

It further must be taken into due consideration that in the case of balanced rudders, owing to the fact that at the commencement of the steering action the centre of pressure lies in front of the rudder axis, the rudder itself is in a state of unstable equilibrium and that therefore the auxiliary rudder, at the beginning of the displacement of the main rudder, in order to prevent this latter from tilting, would be obliged to act directly counter to the main rudder and could only pass over into its proper position in which it would either effect or assist the deflection of the main rudder in the direction required, and also maintain it in this position, after the said main rudder has assumed a certain declination; in other words not until the centre of pressure had shifted to the rear of the rudder axis.

But likewise the problem of maintaining the main rudder in the required position affords special attention, since while the vessel is running, and in particular during the steering operations, alterations in the current are apt to arise, and therewith fluctuations of pressure, which might cause a continual change in the position of the rudder.

Now, all these drawbacks can only be successfuly overcome by an arrangement which, as far as the counterbalancing of forces $x$ and $y$ is concerned, as also with regard to the attention to be paid to the mutual change of the pressures or forces acting on both main and auxiliary rudders, will only make slight demands on the ingenuity of the constructing engineer, and which will to best ability restrict the necessity of maintaining an exact consonance or an upkeep of a definite proportion between the position and size of the auxiliary rudder and that of the main rudder.

An example for an arrangement of this kind is shown diagrammatically in Fig. 3. The freely movable main rudder $1^b$ supports on its spindle 7 a toothed segment 8 which meshes with a toothed segment 9 likewise lodged on the said rudder. The segment 9 is linked on its one side to a transverse arm 10, arranged on the spindle of the auxiliary rudder $2^b$, by means of a connecting rod 11.

The steering operation is effected as follows: On the segment 8 being deflected, say, for about 2°, then—provided the proportion of the diameters of the toothed segments 8.9 relatively to each other, be as, for example, 4:1—the smaller toothed segment 9 will be displaced, and with it the auxiliary rudder $2^b$ connected with it, for a distance of 8°. By these means, said rudder $2^b$ is subjected to pressure, and, in its turn, it effects the deflection of the main rudder $1^c$. Since, however, the toothed segment 9 at the same time rolls along the toothed segment 8, the auxiliary rudder while causing the deflection of the main rudder is automatically turned back into its initial position, and this for a distance until the forces are completely balanced.

Now the same result would have been obtained if the proportion of the diameters of the two toothed segments had been fixed at the value 1 or thereunder. For also in such a case, on the main rudder being deflected, the auxiliary rudder is rotated back. The advantage of the larger proportions resides above all in the fact that on initiating the steering operation there is attained a surplus of steering force by the auxiliary rudder, which offers the full security that the main rudder will reliably attain the position desired. In a like favorable manner this said excess of force will be able to counteract any deflection of the main rudder beyond its limit. For, were this contingency to arise, then the segment 9 would continue to roll along segment 8, as a result of which the auxiliary rudder would powerfully deflect and assume a position in which it would successfully act counter to any further movement on the part of the main rudder.

The same will always then occur whenever it be desired for any reason whatsoever that the main rudder shall depart from the position assumed, including the zero (neutral) position. In the event of any unintentional motion on the part of the main rudder, by which this latter will be deflected, say, for 2°, the auxiliary rudder will be shifted for 8° into a counter pressure position. For this reason, the rudders will attain and retain with utmost exactitude the position they are desired to assume.

Here, too, the auxiliary rudder for its part may be steered, if desired, by a still smaller auxiliary rudder, which may be operated through the axis of the main rudder, this rudder itself, and finally through the axis of the first auxiliary rudder. Such an arrangement is shown by way of example in Fig. 4.

In this arrangement a shaft 13 is disposed within the hollow spindle 12 of the main rudder 1°, which shaft is coupled by means of toothed wheels 14, 15 to a shaft 16 disposed in the hollow spindle 17 of the first auxiliary rudder 2°, and adapted to act upon the spindle of the second auxiliary rudder 20° by means of the toothed wheels 18, 19. The main rudder 1° and the first auxiliary rudder 2° are freely movable, whereas the second auxiliary rudder 20° is rigidly connected to its toothed wheel 19, and is thus operated or steered immediately from the shaft 13. On it being shifted, say, to larboard, it will cause the first auxiliary rudder 2° to deflect to starboard, and therewith the main rudder 1° to deflect to larboard again.

In the place of toothed segments, use may, of course, also be made of toothed couplings, levers, rope or chain drives, or any other form of transmission arrangements.

A transmission arrangement by means of a rope is illustrated by way of example in Figs. 5 and 6 in elevation and plan view, respectively. On a rudder spindle 21 there is mounted a rope pulley 22, and on another spindle 23, the rope pulleys 24 and 25. The spindle of the second auxiliary rudder 20ᵈ carries a pulley 26. A rope 27 is run crosswise over the pulleys 22 and 24, and a rope 28 in the like manner across the pulleys 25 and 26.

Fig. 7 shows a modified form of arrangement, in which the rope 29 is led from the pulley 30 of the spindle 31 of the main rudder, across the pulleys 32, 33, then right through the hollow spindle of the first auxiliary rudder 2ᵉ, then on the stationary pulley 34 of the second auxiliary rudder 20ᵉ, and across the pulleys 35, 36, finally back to the pulley 30. As a result of this arrangement, the position of the first auxiliary rudder does not, as in the case of the arrangement shown in Figs. 4 and 5, immediately affect the position of the second auxiliary rudder, but rather this latter is acted upon directly, by any change of position assumed on the part of the main rudder.

Fig. 8 illustrates the manner of guiding the rope employed for the steering along through the hollow spindle of the main rudder, a single auxiliary rudder being used. The rope 37 is introduced from above, then passed across the guide pulleys 38 arranged in the body of the main rudder 1ᶠ, then on to the sheave 40 of the auxiliary rudder 2ᶠ, which is likewise disposed in the body of the main rudder, and across the sheave 39, it finally passes out again below through the hollow spindle 41 of the main rudder.

The auxiliary rudder may be operated directly from the bridge by mechanical means. However, gear of any other kind whatsoever may be interconnected, say, f. e., hydraulic or electrical gear, or the like. It will be found expedient to duly take care that the driving gear arranged on the bridge, and those disposed at other points of the vessel, execute equal and equally large motions. The driving power may either be a manual one, produced by the man at the wheel, or else may be supplied by sources of power of any kind desired, which the man at the wheel may switch in. Again, the transmission of power may be carried forward to one of the auxiliary rudders, or it may also be arranged to actuate a device, preferably adapted to be self-locking, lodged above the main rudder; which device thereupon will act on an auxiliary rudder by means of mechanical coupling arrangements, such as have been hereinbefore described.

If deemed desirable, two contacts or series of contacts may be connected to the spindle of the main rudder, between which there is disposed an index which, when set on the one row of contacts, will start say a motor arranged at the main rudder, and which motor will deflect the main rudder by aid of the auxiliary rudder in the direction in which the index has been moved As the main rudder attains its correct position, it simultaneously shifts the row of contacts away from the index, whereby this latter will again be in the central (neutral) position, and the motor switched off. Fig. 9 discloses diagrammatically such an arrangement, in which $1^s$ denotes the main rudder, $2^s$ the auxiliary rudder, 42 the spindle of the main rudder, 43 the index mounted thereon, and 44, 45, respectively, the two rows of contacts. It is obvious, that in the place of a motor, also a magnet may be employed, and instead of an electrical device, a pneumatic or hydraulic device for the purposes specified.

If it be desired to operate likewise directly the freely movable main rudder, then the movements of the transmission members disposed co-axially to the main rudder axis may be suitably restricted relatively to the main rudder, and this in the manner indicated, for example, in Fig. 6 by means of the projection 46 formed on disc 22, and the stops 47 provided on the main rudder.

For certain purposes, for example in the case of river craft, it may prove important to provide the main rudder with a special auxiliary rudder for every steering direction. In the same way, and this for reasons of precaution, a plurality of uniformly acting auxiliary rudders may be arranged in one plane either one above the other, or else in different planes, such as is disclosed in Figs. 10 and 11, respectively, in which $1^h$ denotes the main rudder, and $2^h$, $2^i$, $2^k$ and $2^l$, $2^m$, $2^n$, respectively, the auxiliary rudders. But also the main rudder itself may be subdivided into a number of superposed sections, each of which is operated by an auxiliary rudder (Fig. 12).

It will be found expedient to counterbalance both the main as also the auxiliary rudder. In Fig. 13 both the main and auxiliary rudders are counter-balanced by being mounted on a pivot located some distance inwardly from the front edge of each rudder. In this construction the front edge of the auxiliary rudder $2^s$ on being deflected does not pass beyond the edge of the main rudder $1^s$. To prevent foreign bodies from penetrating the space between the main and the auxiliary rudders, the side walls of the main rudder may be extended beyond the rear edge, as indicated at 48, the said extensions being suitably shaped for allowing the ingress of water.

It may, moreover, appear desirable to so dispose the axis of the main rudder, that this latter, provided there were no auxiliary rudder arranged, would have to be considered up to within the proximity of the extreme deflection or even yet in this very position, as being overbalanced. Now, by the provision of the auxiliary rudder $2^t$ (Fig. 14) in the case of such an arrangement, not only is the possibility of the said rudder being overbalanced obviated, but in addition the control action of the main rudder $1^t$ is considerably improved.

Figs. 15 and 16 illustrate a special manner of balancing the main and the auxiliary rudders. In this arrangement, the balancing surface 49 is separated from the rudder surface $1^u$, while being connected to it by lever arms 50 which may project from it either laterally or obliquely. And whereas the balancing surface of the customary type, which forms a part of the rudder body, is merely provided with a short lever arm, the same or even an enhanced effect is produced in the present instance with a balancing surface of smaller size, owing to the provision of longer lever arms. Moreover, the fact of the centre of pressure travelling across the narrow balancing surface is a moment but of minor importance, which moment most favourably affects the displacement of the centre of pressure in respect of the whole rudder. It follows that balancing surfaces of this kind may also prove advantageous regardless of the fact whether an auxiliary rudder is provided or not. In the form of arrangement shown in Fig. 17, there are arranged at either side of the main rudder $1^v$ (shown in dotted lines in its extreme position) the balancing surfaces 51, 52, and this by means of obliquely disposed lever arms 53. In this construction, the one face of the balancing surfaces is so shaped as to constitute an inwardly directed convex surface. As a consequence, when in the extreme position, the one balancing surface, say 51, offers an exceptionally great resistance to the current, and successfully secures the rudder in its extreme position, or else assists the deflection thereof. At the same time, the other balancing surface 52 is shifted into a position in which it is enabled to create a reduced pressure on its convex and an increased pressure on its concave side. The resultant of the difference of pressure is so disposed, that the second surface will co-operate, even as the first, to retain the rudder in its extreme position, respectively, to facilitate the operation of said rudder.

However, the balancing surfaces may also be pivoted to their lever arms, and be controlled by connecting rods which, on the one hand, form contact with the vessel or the main rudder, and, on the other hand, with the balancing surface itself or a stop to which it is subject. A form of construction of this kind is shown in Fig. 18, in which the balancing surfaces 54 are pivoted to the lever arms 55 of the main rudder $1^w$, and which, when this latter is moved, be this either directly or by aid of an auxiliary rudder $2^w$, are taken along in one direction by stops 57 pivoted to the guide members 56, while when said movement is effected in the opposite direction, they adjust themselves in a line parallel to the current.

What has herein been set forth with reference to the balancing surfaces, may be applied with special effect to the auxiliary rudders. Figs. 19 and 20, disclose two forms of execution in which the auxiliary rudder is no longer subject to the immediate control of the man at the wheel, but in which its movements are made dependent upon these executed by the main rudder, the deflection of which takes place in the manner hitherto customary, and is now merely facilitated by the action of the auxiliary rudder. In the form of construction according to Figs. 19, the auxiliary rudder 2$^x$ is connected by means of a connecting rod 58 to the hull 60, and on the main rudder 1$^x$ being turned to starboard, is shifted to larboard. In the form of execution according to Fig. 20, the connection with the hull of the vessel is established by means of a rope 61, adapted to roll up, respectively, off, on the stationary sheaves 62, 63 of the hull 60 and of the auxiliary rudder 2$^y$, respectively. In both cases, at any rate, the automatic setting of the auxiliary rudder, counter to the deflection of the main rudder, effects an acceleration and facilitates the deflection of the main rudder. The forms illustrated in these figures are being claimed in a divisional application, Serial No. 204,517 filed July 9, 1927.

With the view to preventing the formation of eddies at the edges, and also with the view to obtaining fairly high differences of pressure, there may be arranged, (and this essentially horizontally) surfaces transversely to the rudder, and this either on the rudder itself or else either above or below the same. Arrangements of this kind are shown diagrammatically in Figs. 21 and 22, in a perspective view and edge view, respectively. The main rudder 1$^z$ is limited above and below by widely protruding surfaces 64. Above and below the opening cut into the main rudder, there are arranged smaller surfaces 65; within the aforesaid opening, the auxiliary rudder 2$^z$ is adapted to rotate. The surfaces 64 may also be arranged at the hull of the vessel, and the surfaces 65 at the auxiliary rudder.

Since the main rudder oscillates freely about its spindle, this latter may be made to be stationary relatively to the vessel, and to constitute a portion of the ship's structure. Thus, e. g., in the form of construction shown in Fig. 23, a stationary spindle 70 is arranged between the body of the vessel and the extension 71.

The stationary spindle may be constructed along specially favourable lines on combining it with the strengthening pieces of the hull of the vessel, as illustrated in Fig. 24 (in a longitudinal view) and Fig. 25 (in a rear view). In this form of construction, the spindle 72 constitutes a pivot, the broad base of which may be formed integral with the body of the vessel. The main rudder 1$^A$ is adapted to rotate about said spindle on ball bearings 73. A steering shaft 74 is disposed within a longitudinal bore formed in the pivot 72, said shaft serving to effect the movement of the auxiliary rudder 2$^A$, by means of the intermediate shaft 75.

Fig. 26 illustrates a modified form of this construction, in which a hollow spindle 77, together with the steering shaft 78, are disposed within the bore formed in the pivot 76. On the hollow spindle being connected to the main rudder (not shown) by means of laps 79, then one or both rudders may be steered directly, while by means of said hollow spindle the movement of one or both rudders may be transferred upwards in order to act upon the gearing, the switches etc. The hollow spindle might as well be employed to steer the auxiliary rudder, and the shaft to transfer the motion of the main rudder.

By way of a protection for the auxiliary rudders there may be arranged protective surfaces on the main rudder 1$^M$, and this transversely to the plane of the rudder, as illustrated, by way of example, in Figs. 27 and 28, in an elevation and plan view, respectively, in which the surfaces 100 project beyond the auxiliary rudders 2$^M$ to such an extent, that these are most reliably secured against any injury by mechanical means.

In the arrangement according to Fig. 29, the said protective walls 101 extend only sideways of the auxiliary rudder; they are, however, also arranged on the first auxiliary rudder to protect the second, and on the second for the protection of the third, etc.

Protective surfaces 102, which are arranged perpendicularly intermediate the surfaces 101, and which may also act as guide faces complete the protection provided for the auxiliary rudders.

In the arrangement according to Fig. 30, the main rudder is provided with obliquely disposed arms 103 having perpendicular guide surfaces 104. On these latter there are arranged the auxiliary steering surfaces 105, adapted to co-operate with the first auxiliary rudder at the main rudder, and with which they are connected by means of connecting rods 106, or the like. The auxiliary rudders thus connected are steered by the second auxiliary rudder, disposed intermediate, and protected against any possibility of injury from without. As a further means of protection, there is arranged a lattice work structure 107, the bars of which have the most favourable profile formation possible. Horizontal protective surfaces (not shown in the drawing) connect the stationary parts to a rigid structure.

The rudder structures disclosed in Figs. 31 and 32 possess the shape of a box, through which the water is enabled to flow. Within this internal current the smallest and most sensitive auxiliary rudders are arranged to operate. In this arrangement the main rudder comprises three vertical surfaces $1^P$, $1^R$, $1^R$, interconnected by means of horizontal protective surfaces 108. A honeycomb-shaped structure 109 serves as a protection against foreign bodies being washed in by the current. The auxiliary rudders $2^P$ and $20^P$ arranged at the surface $1^P$, are protected by means of auxiliary surfaces 110, arranged freely to move on the surfaces $1^R$, which follow the motions executed by the auxiliary rudders, even as though they were connected thereto, since they are moved by the deflected current.

A modification of this form of construction is shown in Fig. 32, in which there are arranged between the three stationary surfaces $1^Q$, two additional stationary guide surfaces 111 along with auxiliary rudders $2^{Q1}$, which are connected to the auxiliary rudder $2^Q$ of same size by means of guide members 112.

The main rudder actuated in accordance with my invention by means of auxiliary rudders, will be found to be particularly suitable as a bow rudder, see Fig. 33.

As a precaution against the auxiliary rudders and the gearing freezing, the main rudder may be provided with steam heat or be heated electrically.

In order to enhance the sensitiveness of the auxiliary rudder, it may be shaped in the manner disclosed in Figs. 34 and 35. As will be seen, the surface of the rudder is divided into two sections 115, 116 forming an angle, intermediate which a transverse surface 117 may be interposed to prevent the formation of eddy currents. When in their normal position, the two sections possess the same though contrary angle of inclination of, say, 3° relatively to the current. If the auxiliary rudder be now shifted for, say, 3° toward larboard, then the larboard position of section 116 is increased, while the starboard position of section 115 is reduced by the value of these three degrees. The section 116 is thus disposed at 6° and the section 115 at 0° relatively the normal position. If then the force acting on section 116 was at first $x$, it will now be in excess of $2^x$, since the pressure curve very powerfully augments with the size of the angular position assumed, whereas the pressure on a non-intercrossed (level) rudder can never amount to more than $2^x$.

Seeing that the auxiliary rudder arrangement hereinbefore described will not be immediately suitable for sailing astern, it will be found expedient to enable the main rudder to be set freely in any angle required, so that it can turn in a full circle about its axis. This being the case, then, on the astern movement of the vessel being initiated, the main rudder will swing owing to the reversal of the current. In this contingency care must be taken that the auxiliary rudder, provided its gear be self-locking, or when, on the steering operation being effected manually, the steering wheel is to remain stationary, shall be able to rotate freely, or at least that its movement be rendered unstable or become an oscillating motion.

If the main rudder be connected to an auxiliary rudder, as shown in Fig. 36, which either serves to reset the main rudder or else to reduce the work required to be done in order to set the main rudder, then this said auxiliary rudder must be enabled to operate properly even when the main rudder has been reversed.

This may be done in accordance with my invention by various means. Primarily, the arrangement must be such that the motion of the main rudder will be in no way impeded by the auxiliary rudder. In connection herewith the auxiliary rudder may be arranged to move during a continuous movement of the main rudder in one particular direction, either continuously or non-continuously, in that either the movement of the auxiliary rudder is intercepted, or in that it is caused to execute an oscillating motion relatively to the main rudder.

In the arrangement shown in Fig. 36, 125 denotes the bow or stern of a vessel, according to whether the rudder be arranged fore or aft, while 126 is the main rudder, and 127 the auxiliary rudder. The movement of the auxiliary rudder is also in this case preferably effected through the spindle 128 of the main rudder. The spindle of the auxiliary rudder is unilaterally disposed, i. e. shifted out of the longitudinal centre. It follows herefrom that the rear edge of the main rudder and the front edge of the auxiliary rudder are arranged at a distance sufficiently large to enable the tail end, or the head, respectively of the auxiliary rudder to pass through in the course of the rotation. The auxiliary rudder is driven say by an electromotor 129, driving the shaft 130 preferably across a self-locking transmission arrangement. By means of the sets of bevel wheels 131, 132, 133, 134 the movement is transferred on to the auxiliary rudder. The motor 129 is started in order to displace the main rudder, and it displaces the auxiliary rudder 127 against the current. As the vessel begins to sail astern, the main rudder will effect a reverse in accordance with the altered direction in which the vessel now travels and also with the flow of current, be this reverse action carried out either automatically or by aid of the auxiliary rudder, then the bevel wheel 132 will roll on wheel 131. The auxiliary rudder 127 continues to rotate around its axis until it has attained the new position required. The ratio of gear of the bevel wheels is so arranged that the auxiliary rudder will again assume its proper position in the altered position taken up by the main rudder. This will be the case provided the ratio of gear represent a whole number. Still it will be found expedient to maintain definite values for the ratio of gear, and this for the following reasons:

As will be observed from the drawings, the connection between the main rudder and the auxiliary rudder is such, that on the main rudder executing any undesirable movements, the auxiliary rudder will automatically assume a position bound to counteract the undesirable movement of the main rudder, and thus shift this latter back into its proper position. If, for example, the rear edge of the main rudder were to rotate downwardly out of the plane of the drawing, then the bevel wheel 132 will roll on wheel 133 in such a manner that wheel 134 (viewed from the rear) will rotate to the right. In this contingency, the auxiliary rudder 127 will, by aid of the wheel 133, be likewise rotated with its rear edge out of the plane of the drawing, and this more powerfully than the main rudder. The current then exerts such a force upon the auxiliary rudder that the moment acting around the main rudder axis will carry the main rudder back into its initial position. It follows that for the automatic return operation, the auxiliary rudder must be set to operate in the same direction as the main rudder, for the actual steering operation in the counter direction.

If a second auxiliary rudder be arranged, which shall act on the first auxiliary rudder, then the movement of this second auxiliary rudder will be the reverse of that of the first, consequently, during the automatic return action in a contrary sense to the movement of the main rudder, and during the actual steering operation in the same sense thereto. If more than two auxiliary rudders be employed, an arrangement which may be found to be practical in the case of very big rudders, then the odd numbered auxiliary rudders will follow the motion of the first, and the even numbered auxiliary rudders will follow the motion of the second auxiliary rudder. If, on the vessel reversing its direction, the main rudder also assume a reversed position, then the auxiliary rudder must again counteract any undesirable action on the part of said main rudder. This result will, as a rule, be obtained (in particular also in the arrangement shown in the drawings) whenever the ratio of gear represents a whole number. In the form of execution shown in Fig. 36, the axis of the auxiliary rudder had been shifted to one side, out of the longitudinal centre. If now the axis of the auxiliary rudder be lodged centrally, as shown, for example, in Fig. 37, then it will not be necessary to leave any space between the front edge of the auxiliary rudder and the rear edge of the main rudder; on the contrary, it will be found expedient to arrange the two edges as closely as possible to each other. Nor is it necessary in this case that the ratio of gear represent a whole number. In an arrangement of this kind under certain circumstances, there will arise considerable forces as soon as the auxiliary rudder moves out of the plane of the main rudder. Now to enable these forces to increase gradually, it will be found practical if one of the two abutting edges, say, the rear edge of the main rudder, or else the front edge of the auxiliary rudder, or even the entire auxiliary rudder, obtain a curved shape, for example, an undulated, or may be also a stepped profile formation, such as is disclosed in Figs. 38 to 40.

The arrangements shown in Figs. 36 and 37 were intended to exemplify the fact that on the movement of the main rudder being a continuous one, that of the auxiliary rudder will also be continuous. Now, as already above set forth, there is the possibility of arranging the auxiliary rudder in such a manner that on the main rudder rotating continuously, the auxiliary rudder will move non-continuously. Thus, for example, during a continuous movement of the main rudder, its connection with the auxiliary rudder may be broken as soon as the main rudder, in the course of its motion, attains the inoperative zone. However, still more expedient will be found to be arrangements in the case of which during the continuous motion of the main rudder in one direction, the auxiliary rudder will execute an oscillating motion relatively to the main rudder.

A form of execution of such an arrangement is shown in Fig. 41, in which 126 denotes the main rudder and 127 the auxiliary rudder. The auxiliary rudder is also in this case operated by means of a device arranged in the spindle 128 of the main rudder. 130 denotes the motor, driven by electricity, by hydraulic means, or the like, and driving the set of toothed wheels 135, 136 by aid of a self-locking gear arrangement. The toothed wheel 136 is mounted on a shaft disposed within a gear box 137 adapted to move with the rudder. The toothed wheel 136 carries a pivot 138 moving conjointly with the block 139 in the link 140 (Fig. 42). The link in addition is provided with a rack 141 with which a toothed wheel 142, driving the auxiliary rudder 127 by aid of a suitable gearing, is adapted to mesh. The ratio of gear and the length of the rack must be so dimensioned that during the movement of the rudder within the operative zone, the auxiliary rudder will execute a continuous motion. When, however, on the vessel sailing astern, the main rudder is rotated by the current into a position corresponding to its change of flow, then the auxiliary rudder will, while the main rudder is shifted into the inoperative zone, carry out a reverse motion, only to again resume its proper position as soon as the main rudder has attained its new position for astern sailing. But also in this case, the arrangement is such the auxiliary rudder will reset the main rudder as soon as it begins to execute undesirable motions, and this regardless whether the main rudder be disposed in consonance with the current for going ahead or going astern.

It will be readily understood from this that the drive required for the auxiliary rudder, even in the case of very big main rudders, will be extremely small. The intermediate gear, which in the drawing for the sake of a better understanding is shown excessively large, likewise becomes small, so it may be readily mounted firmly on the spindle of the main rudder. It is moreover preferably disposed within the interior of the vessel, and supports the small driving motor for the auxiliary rudder, which motor must obviously be rigidly connected to the vessel.

As the gear box is relatively small and may be moved conjointly with the main rudder, there exists the direct possibility of arranging it within the main rudder so that it shall not project beyond its profile formation. By these means there are obtained extremely small and well protected gear arrangements, which may be carried out with a high degree of reliability of service.

The aforesaid arrangements merely represent examples of execution. Thus, in the place of a bevel wheel gear also other suitable gear arrangements may be made use of namely all such gear, as will, varying according to requirement, admit of both a relative movement of the several parts with respect to each other, as also of conjoint movements of the same, as, for example, epicylic gear, and the like.

In special cases it will prove of advantage to initiate the reversal of the main rudder by means of a special device, such as is shown in Fig. 43. In this arrangement there is disposed in addition on the main rudder 126, and this either above or below the auxiliary rudder, an entirely freely movable tail rudder 145 provided with stops 146. While the vessel is going ahead, this said rear rudder trails loosely in the current, as soon, however, as the direction of the current changes owing to a reversal of the vessel's movement, the altered current (see the arrow shown in dotted lines) will shift said tail rudder, which meanwhile has become unsteady, until it engages the main rudder surface by means of one of the stops 146, so that it is now adapted to serve as a pressure surface with a long lever arm for the action of the current, and thereby to initiate the reversal of the main rudder.

When steering straight ahead, and in other cases, the main rudder may be fixed in its normal position, the steering being effected solely by aid of the auxiliary rudder.

I wish it to be understood that I do not desire to be limited to the exact details of construction shown and described, for obvious modifications will occur to a person skilled in the art.

The term water-borne ship as used herein is intended to designate a ship navigated on the surface of the water.

I claim:—

1. In a water-borne ship's rudder in combination, a main rudder adapted to turn loosely through a full circle, an auxiliary rudder disposed to the rear of and in the plane of said main rudder and means independent from said main rudder for actuating said auxiliary rudder.

2. In a water-borne ship in combination, a main rudder adapted to turn loosely about its axis, an auxiliary rudder hinged to the rear edge of said main rudder and means independent from said main rudder for actuating said auxiliary rudder in either direction.

3. The combination with a water-borne ship, of a ship's main rudder loosely mounted on the ship for free rotary movement, an auxiliary rudder mounted on the main rudder near the rear edge thereof, and means for turning the auxiliary rudder to steer the main rudder and hence the ship.

4. The combination with a water-borne ship, of a ship's main rudder loosely mounted on the ship for free rotary movement through a full circle, an auxiliary rudder mounted on the main rudder near the rear edge thereof, and means for turning the auxiliary rudder to steer the main rudder and hence the ship.

5. In a steering device for water-borne ships in combination, a rudder, an auxiliary pressure surface pivoted to said rudder near the rear edge thereof and gearing inserted between said rudder and said surface whereby this latter is caused, under the influence of the forces of flow acting thereon, to further the movement of said rudder.

6. In a water borne ship in combination, a main rudder, a counterbalanced auxiliary rudder movably connected with said main rudder and substantially vertical protective surfaces extending from said main rudder on both sides of said auxiliary rudder.

7. In a water borne ship in combination, a main rudder, an auxiliary rudder movably connected to said main rudder, means for actuating said auxiliary rudder directly, an arm extending from said main rudder forward in front of its axis of rotation and a balancing surface connected with said arm.

8. In a water borne ship in combination, a main rudder, an auxiliary rudder movably connected to said main rudder, means for actuating said auxiliary rudder directly, an arm extending forward on each side of said main rudder in front of its axis of rotation and a balancing surface connected with said arm, the inner face of said balancing surface being convex-shaped.

9. In a water borne ship in combination, a main rudder, an auxiliary rudder movably connected with said main rudder and protective surfaces situated on the main rudder for the protection of the auxiliary rudder.

10. In a water borne ship in combination, a main rudder, an auxiliary rudder movably connected with said main rudder and protective surfaces extending horizontally above and below said auxiliary rudder.

11. In a water borne ship in combination, a main rudder, an auxiliary rudder movably connected with said main rudder and protective surfaces connected with and partly enclosing said rudders.

12. In a water borne ship in combination, a pivot pin fixed to the hull by a broad base and extending downwards therefrom, a main rudder mounted on and adapted to turn about said pin, an auxiliary rudder connected to said main rudder and a steering spindle extending through said pin and serving for actuating said auxiliary rudder.

13. In a water borne ship in combination, a pivot pin fixed to the hull by a broad base and extending downwards therefrom, a main rudder mounted on and adapted to turn about said pin, an auxiliary rudder connected to said main rudder, a hollow spindle extending through said pin and another spindle extending through said hollow spindle, one of said spindles serving for actuating said auxiliary rudder.

14. In a water borne ship in combination, a pivot pin fixed to the hull by a broad base and extending downwards therefrom, a main rudder mounted on and adapted to turn about said pin, an auxiliary rudder connected to said main rudder, a hollow spindle extending through said pin and another spindle extending through said hollow spindle, one of said spindles being connected with said main rudder, the other spindle serving for actuating said auxiliary rudder.

15. In a water borne ship in combination, a main rudder and an auxiliary rudder connected to said main rudder, the upper portion of said auxiliary rudder being disposed at an angle relatively to the lower portion, the auxiliary rudder being substantially vertical and in the same general vertical plane as the main rudder.

16. In a water borne ship in combination, a main rudder and an auxiliary rudder connected to said main rudder, said auxiliary rudder having a staggered surface, the auxiliary rudder being substantially vertical and in the same general vertical plane as the main rudder.

17. In a water borne ship in combination, a main rudder adapted to turn through a full circle, an auxiliary rudder connected with said main rudder and gearing between said main and auxiliary rudders for causing said auxiliary rudder, on said main rudder turning through an angle of more than 90°, to execute an oscillating motion relatively to said main rudder in returning to a normal condition.

18. In a water borne ship in combination, a main rudder, an auxiliary rudder movably connected to said main rudder, means for actuating said auxiliary rudder relatively to said main rudder and a loose tail rudder connected with said main rudder in the plane of said auxiliary rudder.

19. In a water borne ship in combination, a main rudder, an auxiliary rudder connected with said main rudder, means for actuating said auxiliary rudder directly and stops on one of said rudders causing said main rudder, on said auxiliary rudder having attained a certain angular position relatively to said main rudder to be acted upon directly by said actuating means.

20. In a waterborne ship in combination, a main rudder adapted to turn through a full circle, an auxiliary rudder mounted near the rear edge of said main rudder and gearing between said main and auxiliary rudders for causing said auxiliary rudder, on said main rudder having turned through an angle of more than 90°, to again assume its normal position relatively to said main rudder.

21. In a water-borne ship the combination of a loosely mounted main rudder capable of turning through a full circle, an auxiliary rudder mounted on the main rudder near the rear edge thereof, the two rudders being so connected that if the main rudder is moved to one side by the waves the auxiliary rudder is automatically deflected in the same direction relative to the main rudder so as to return the main rudder to its former position.

In testimony whereof I affix my signature.

ANTON FLETTNER.

CERTIFICATE OF CORRECTION.

Patent No. 1,661,114.  Granted February 28, 1928, to

ANTON FLETTNER.

It is hereby certified that error appears in the printed specification of the above numbered patent requiring correction as follows: Page 2, line 85, for the misspelled word "successfuly" read "successfully"; page 4, line 5, for the word "disclosed" read "discloses"; page 5, lines 82, 84 and 85, for the words "one or both rudders" read "the main rudder"; page 6, lines 33 and 34, in both instances, for the words "the main rudder" read "one or both rudders"; and that the said Letters Patent should be read with these corrections therein that the same may conform to the record of the case in the Patent Office Signed and sealed this 29th day of May, A. D. 1928.

(Seal)

M. J. Moore,
Acting Commissioner of Patents.